US000001937H

(19) United States

(12) Statutory Invention Registration (10) Reg. No.: US H1937 H

Abercrombie et al. (43) Published: Feb. 6, 2001

(54) LASER BAROMETER

(75) Inventors: Kevin R. Abercrombie, Westminster; David Shiels, Thornton; Tim Rash, Aurora, all of CO (US)

(73) Assignee: The United States of America as represented by the United States Department of Energy, Washington, DC (US)

(21) Appl. No.: 08/613,784

(22) Filed: Feb. 29, 1996

(51) Int. Cl.[7] ..... G01L 7/20

(52) U.S. Cl. ..... 73/384; 73/705; 250/227.27

(58) Field of Search ..... 73/31.04, 384, 73/705; 250/227.27, 231.19; 356/361, 358, 363

(56) References Cited

U.S. PATENT DOCUMENTS 4,619,529 * 10/1986 Iuchi et al. ..... 356/358
4,659,923 * 4/1987 Hicks ..... 73/705 X
4,688,940 * 8/1987 Sommergren et al. ..... 356/358 X
4,702,604 * 10/1987 Achtermann et al. ..... 356/361
4,938,062 * 7/1990 Shimizu et al. ..... 73/384 X
5,101,664 4/1992 Hockaday et al. ..... 73/704
5,363,196 * 11/1994 Cameron ..... 356/358
5,414,509 * 5/1995 Veligdan ..... 356/349

* cited by examiner

*Primary Examiner*—Harold J. Tudor
(74) *Attorney, Agent, or Firm*—John T. Lucas; William R. Moser; Paul A. Gottlieb

(57) ABSTRACT

A pressure measuring instrument that utilizes the change of the refractive index of a gas as a function of pressure and the coherent nature of a laser light to determine the barometric pressure within an environment. As the gas pressure in a closed environment varies, the index of refraction of the gas changes. The amount of change is a function of the gas pressure. By illuminating the gas with a laser light source, causing the wavelength of the light to change, pressure can be quantified by measuring the shift in fringes (alternating light and dark bands produced when coherent light is mixed) in an interferometer.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LASER BAROMETER

The United States Government has rights in this invention pursuant to contract No. DE-AC04-90DP62349 between EG&G Rocky Flats, Inc. and the United States Department of Energy.

FIELD OF THE INVENTION

This invention relates to a pressure measuring instrument, and more particularly to a pressure measuring instrument which utilizes coherent light from a laser to measure the pressure within an enclosed environment, accomplished by the change of the refractive index of a gas in an environment as a function of applied pressure.

BACKGROUND OF THE INVENTION

Pressure instruments that serve as a background for the invention can be grouped into three categories: general purpose pressure instruments; manometers; and piston gauges. General purpose pressure instruments are devices such as Bourdon tube pressure gauges, capacitance diaphragm gauges and pressure transducers which are used to monitor/measure process parameters or as secondary standards used in the calibration of process equipment. Bourdon tube gauges use an elastic tube which flexes as a function of the applied pressure. Capacitance diaphragm gauges use a moveable membrane which varies the capacitance of the sensing element as a function of the applied pressure. Pressure transducers use a strain gauge which changes value as a function of the applied pressure. These instruments either use elastic elements or moving parts.

Manometers are liquid filled devices which measure pressure as a function of the change in height of the column(s) of the liquid. These devices can use water, alcohol, benzine, mercury or other fluids as the measurement medium. The difference in the column heights is monitored with a scale or ruler calibrated in the pressure units of interest. In the most accurate namometers, lasers have been used to measure the column heights. In this fluid based measurement system, it is necessary to change fluids at specified intervals. Because alcohol, benzine and mercury are all RCRA (Resource Conservation Recovery Act) regulated hazardous materials this procedure produces hazardous wastes.

Piston gauges are pressure measurement systems that measure pressure based on the cross sectional area of a piston and an applied mass. These instruments are typically used as primary pressure standards due to the fact that the measurement is based upon the physical quantities of mass and area. During use, a mass consisting of one or more certified weights is placed upon a weight table which is attached to the piston. The applied pressure is then increased or decreased through the use of valves and volume adjusters in order to place the piston and mass on a float, the term float referring to a point when the piston is free to move and encounters no friction forces from the upper or lower physical restraints used to hold the piston within its cylinder. Piston gauges of this caliber are manufactured to extremely tight tolerances. As with the other gauges, piston gauges contain moving parts.

Thus it is an object of the invention to provide a pressure measuring means free from moving parts or elastic elements.

It is another object of this invention to provide a pressure measuring means that reduces, or ultimately eliminates, the use of hazardous waste materials.

It is yet another object of the invention to provide a pressure measuring means that does not require the use of weights to measure pressure.

These objects may be achieved by providing a pressure monitoring apparatus that utilizes changes in laser light energy as a result of modulations or changes in atmospheric pressure to accurately measure pressure within a system or environment.

SUMMARY OF INVENTION

To achieve the foregoing and other objects, and in accordance with the purposes of the present invention as described herein, a novel apparatus for measuring pressure within an environment is now presented. The pressure measuring instrument described herein utilizes the change of the refractive index of a gas as a function of pressure and the coherent nature of a laser light to determine the pressure within a closed environment. For example, as the gas pressure in a closed tube varies, the index of refraction of the gas changes. The amount of the change in the index of refraction is a function of the gas pressure. By illuminating the gas with a laser light source, a change in pressure within the closed environment which causes the wavelength of the light to change can be quantified by measuring the shift in fringes (alternating light and dark bands produced when coherent light is mixed) in an interferometer. This technique produces a primary measurement standard because the resulting measurement is based upon the wavelength of the laser light. The invention is useful in laboratories as a primary pressure standard to replace means such as existing mercury manometers to achieve accurate pressure measurements.

Still other objects of the present invention will become readily apparent to those skilled in this art from the following detailed description wherein the preferred embodiment of the invention is described. The invention will be set forth in part in the description that follows and in part will become apparent to those so skilled in the art upon examination of the following description or may be learned by practice of the invention. Accordingly, the drawing and description will be regarded as illustrative in nature and not as restrictive.

BRIEF DESCRIPTION OF THE DRAWINGS

The accompanying drawing incorporated in and forming part of the specification illustrates the present invention, and together with the description serve to explain the principles of the invention.

DETAILED DESCRIPTION OF THE INVENTION

Figure 1:
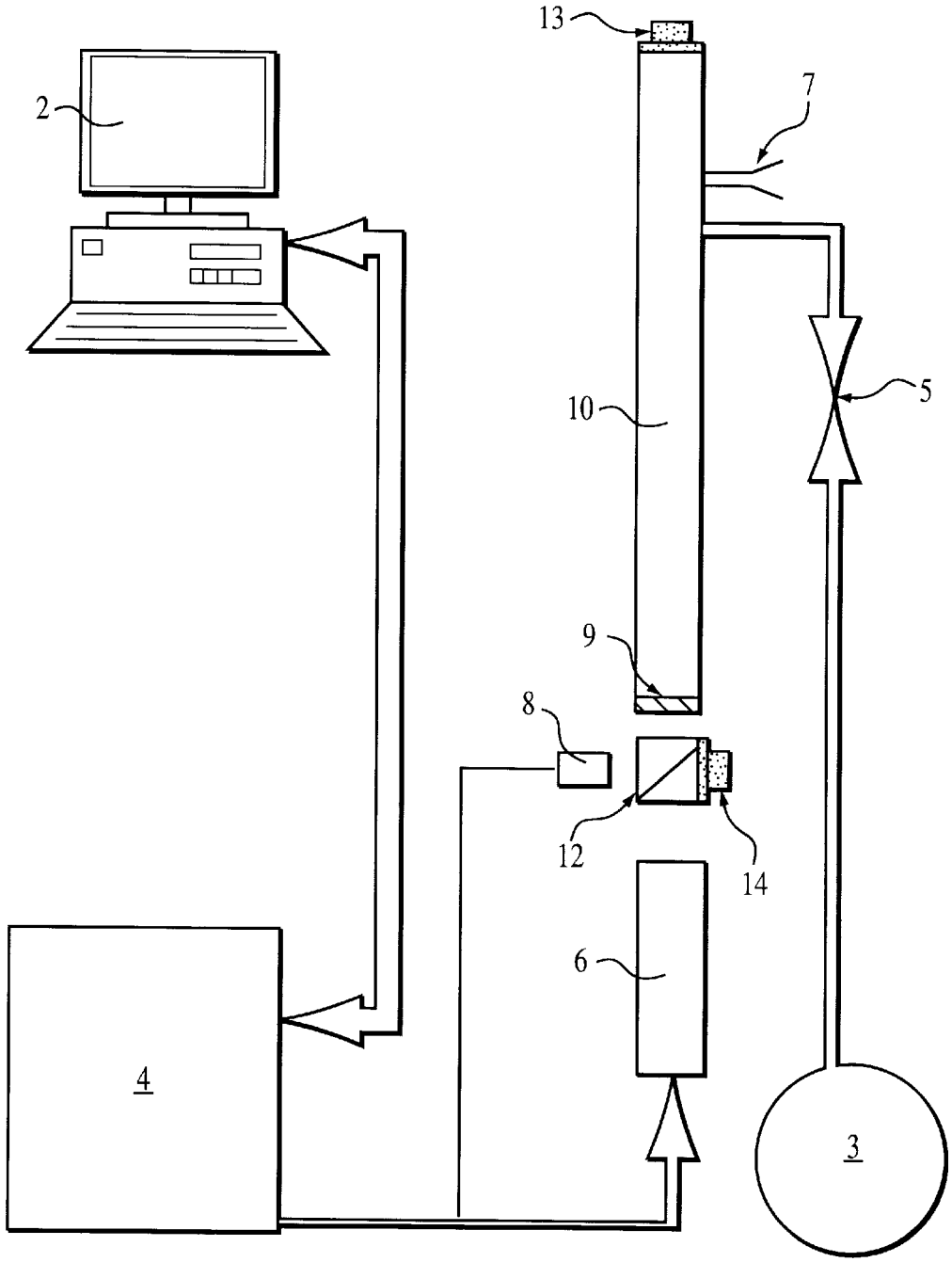
FIG. 1 illustrates a plan view of the laser barometer in a system configuration.

The purpose of this invention is to provide a pressure measurement apparatus that utilizes the change in the index of refraction of a gas as function of gas pressure and the coherent nature of the laser light.

Referring to FIG. 1, the laser barometer of the present invention is illustrated in a system configuration. In the preferred embodiment of the invention the basic components for the laser barometer include a computer 2, laser electronics 4, a laser 6, a photodetector 8, a measurement tube 10, an interferometer 12, reflectors 13–14, a vacuum pump 3, a gate valve 5, gas inlet port 7, and an optical window 9. When the system as illustrated is in operation, the vacuum pump 3 is used to evacuate the measurement tube 10 in order to establish a reference pressure in the range of 10 mTorr. The laser 6 is turned on and the beam passes through the interferometer 12 where the beam is split into two separate components.

The first component is part of the laser beam that is directed at a right angle to the initial direction of the laser beam. The second component is the part of the laser beam that continues past the interferometer 12. After the first component is split at the interferometer 12 it is reflected off a side reflector 14 and back through the interferometer 12 into a photodetector 8.

The second beam component travels through the interferometer 12 towards the measurement tube 10 where the beam enters an optical window 9 and travels through the measurement tube 10 to a reflector 13 at the back of the measurement tube 10. The beam is reflected by the reflector 14 at the rear of the measurement tube 10 through the measurement tube 10, through the optical window 9, and back into the interferometer 12 where it is directed in parallel to and mixed with the first beam component.

The mixing of the two beam components which are now out of phase with respect to each other causes the generation of fringe lines within the interferometer 12 and consequently by the photodetector 8. At this time the zero pressure reference is established for the laser barometer 1.

After the zero reference is established, the gate valve 5 is closed in order to isolate the vacuum pump 3 from the measurement tube 10. At this time gas can be admitted through the gas inlet port 7. The admission of gas into the measurement tube 10 causes the index of refraction ($\mu$) within the measurement tube 10 to change. This change in $\mu$ is proportional to the gas pressure within the measurement tube 10. The change in $\mu$ causes the wavelength of the laser light to change which in turn causes the fringes formed in the interferometer 12 to shift. This shift in fringes is detected by the photodetector 8. The photodetector 8 then transmits electronic pulses to the laser electronics 4 which are proportional to the number of fringes that shift past the sensing element of the photodetector 8. The laser electronics 4 then transmits the information to the system computer 2 which performs the mathematical conversions necessary to change the laser electronics information into pressure units.

Pressure is calculated by the computer using the following mathematical model:

$$P = \frac{N * \lambda}{m * l * (1 + \alpha * (t - 20))} * \frac{(1 + a * t) * 760}{\mu - 1}$$

Where:

P=the applied pressure (Torr)

N=the number of fringes detected by the photo detector $\lambda$=the vacuum wavelength of the LASER m=(the number of paths the light beam travels within the tube)

l=the length of the tube (meters)

a=the gas expansion coefficient t=the temperature of the system (°C.)

$\alpha$=the linear coefficient of expansion for the tube $\mu$=the index of refraction for the calibration gas at 0° C. and 760 mmHg The addition of a second tube, a beam splitter and support opto-electronics would allow the device to be used as a differential pressure instrument. Also, by lengthening the tube or increasing the number of internal reflections within the tube, the sensitivity of the system can be increased.

The embodiments specifically disclosed herein were chosen and described in order to best illustrate the principles of the invention and its practical application to thereby enable one of ordinary skill in the art to best utilize the invention in various embodiments and with various modifications as are suited for the particular use contemplated. Other embodiments of the invention will be apparent to those skilled in the art from a consideration of this specification and in practice of the invention disclosed herein. It is intended that the specification and the examples be considered as exemplary only, with the true scope and spirit of the invention being indicated in the following claims.

What is claimed is:

1. A pressure measuring instrument comprising:

a) a means for generating a laser beam;

b) a photodetector for receiving a laser beam;

c) a container capable of containing diverse atmospheric environments, said container comprising an optical window on a first end of said container, and a reflecting means located at a second end of said container, d) an interferometer for receiving said laser beam and splitting said laser beam into first and second components, directing said first component to said photodetector wherein said first component serves as a reference signal, and directing said second component to said container wherein said second component serves as a measuring signal, and wherein said second component enters said container through said optical window and is reflected by said reflecting means back through said container and said optical window to said interferometer where said second component is mixed with said first component and where said mixing of first and second components which are out-of-phase with respect to each other generates a series of fringes and where a shift in said series of fringes generated within said interferometer is detected by said photodetector; and where said photodetector outputs an electronic pulse; and e) a computer means coupled to said photodetector for determining the calibration of a pressure based on said first and second components prior to introducing gas into said container, and for determining said pressure within said container once gas is introduced into said container by converting said output electronic pulses into pressure units.

2. The instrument of claim 1, further comprising;

f) a vacuum pump for evacuating said container prior to calibration or the introduction of gas into said container; and g) an inlet means for introducing said gas into said container after said calibration and said evacuation.

3. The invention of claim 2 wherein said inlet means for introducing gas into said container is a valve means.

4. A pressure measuring instrument comprising:

a) a means for generating a laser beam;

b) a photodetector for receiving a laser beam;

c) a tube capable of containing diverse atmospheric environments, said tube comprising an optical window on a first end of said tube, and a reflecting means located at a second end of said tube;

d) an interferometer for receiving said laser beam and splitting said laser beam into first and second components, directing said first component to said photodetector wherein said first component serves as a reference signal, and directing said second component to said tube wherein said second component serves as a measuring signal, and wherein said second component enters said tube through said optical window and is reflected by said reflecting means back through said tube and said optical window to said interferometer where said second component is mixed with said first component and where said mixing of first and second components which are out-of-phase with respect to each other generates a series of fringes and where a shift in said series of fringes generated within said interferometer is detected by said photodetector; and where said photodetector outputs an electronic pulse; and e) a computer means coupled to said photodetector for determining the calibration of a pressure based on said first and second components prior to introducing gas into said tube, and for determining said pressure within said tube once gas is introduced into said tube by converting said output electronic pulses into pressure units.

5. The instrument of claim 4, further comprising:

a vacuum pump for evacuating said tube prior to calibration or the introduction of gas into said tube; and an inlet means for introducing said gas to be measured into said tube.

6. The invention of claim 5 wherein said inlet means for introducing gas into said tube is a valve means.

* * * * *